United States Patent [19]

Soulard

[11] 3,858,354
[45] Jan. 7, 1975

[54] ACTIVATING COMPOSITION FOR THE TAPPING OF TREES

[75] Inventor: Patrick Marie Alfred Soulard, Talence, France

[73] Assignee: Societe D'Interet Collectif Agricole Des Sylviculteurs Du Sud-Ouest (S.I.C.A.S.S.O.), Bordeaux, France

[22] Filed: Oct. 4, 1973

[21] Appl. No.: 404,631

Related U.S. Application Data

[62] Division of Ser. No. 305,282, Nov. 10, 1972, abandoned.

[30] Foreign Application Priority Data

Nov. 25, 1971  France .............................. 71.42229

[52] U.S. Cl. .................................................... 47/10
[51] Int. Cl............................................. A01g 23/10
[58] Field of Search .................................. 47/10-12

[56] References Cited
UNITED STATES PATENTS

| | | | |
|---|---|---|---|
| 2,053,031 | 9/1936 | Hessenland et al..................... | 47/10 |
| 3,022,604 | 2/1962 | Greth et al............................. | 47/10 |
| 3,359,681 | 12/1967 | Clements................................ | 47/10 |

FOREIGN PATENTS OR APPLICATIONS 275,586   10/1970   U.S.S.R.

*Primary Examiner*—Robert E. Bagwill
*Attorney, Agent, or Firm*—Young & Thompson

[57] ABSTRACT

This invention relates to an activating composition for the tapping of trees, particularly of live trees of the Pinus family. Said composition comprises (dry weight) 5–60 parts of an alkali metal or alkaline-earth metal or ammonium lignosulfite and (calculated as $H_2SO_4$) 24–93 parts of an aqueous sulfuric acid having a $H_2SO_4$ concentration of 30–94 wt percent.

11 Claims, No Drawings

ACTIVATING COMPOSITION FOR THE TAPPING OF TREES

This is a division, of application Ser. No. 305,282, filed Nov. 10, 1972 now abandoned.

This invention relates to an activating composition for the tapping of trees, and more particularly of live trees of the Pinus family.

It is known, since some years, to use 48° Be sulfuric acid to activate or promote the tapping of live trees, such as trees of the Pinus family. The sulfuric acid is sprayed onto the notches formed in the trees and its effect is to promote the secretion of the resin.

The object of this invention is to provide a new sulfuric acid activating composition which will result in increased yields of resin production without any danger of deterioration of the tree to which it is applied.

This composition is characterized in that it comprises, by weight, 5–60 parts (dry material) of an alkali metal or alkaline-earth metal or ammonium lignosulfite and 24–93 parts (calculated as $H_2SO_4$) of an aqueous sulfuric acid having a $H_2SO_4$ concentration of about 30 to about 94 wt. percent.

According to another feature of the invention, the composition contains also urea in an amount equal at most to about 10 parts by weight.

Further features and advantages of this invention will be apparent from the ensuing description.

The composition according to this invention comprises essentially sulfuric acid and a lignosulfite.

The lignosulfite used is selected from the group consisting of the alkali metal (particularly sodium), alkaline-earth metal (particularly calcium) and ammonium lignosulfites.

Ammonium lignosulfite is preferred in view of the relatively acidic pH (within a range of about 3 to about 7) of its aqueous solutions.

The lignosulfite is used in the composition of this invention in an amount of about 5 to about 60 parts, by weight. For liquid compositions typically applicable by spraying, amounts of 5–15 parts, by weight, are advantageously used. To obtain pasty compositions typically applicable in the form of cords deposited on the notches, amounts of lignosulfite closer to the higher values of this range will be used.

A pasty composition will also be obtained by adding to the aforementioned components varying amounts of a filler such as kaolin.

The lignosulfite may be added to the composition in powder form, or as an aqueous solution, as explained hereinafter.

The second component of the composition of this invention is sulfuric acid. It may be used in an amount of 24–93 parts, by weight, calculated as $H_2SO_4$. It is provided in the form of an aqueous sulfuric acid having an $H_2SO_4$ concentration of about 30 to about 94 wt. percent, the higher concentration corresponding to the most concentrated acid presently available commercially (66° Be = 93.19% $H_2SO_4$).

The concentration of the acid will be selected on the basis of the type of formulation (liquid or pasty) selected for the composition, and also of the climate conditions prevailing at the place of application of the composition. Thus, for example, the higher the ambient temperature, the lower the concentration advantageously selected, this being for the purpose of preventing an attack of the tree on which the composition is applied.

The composition may also, although not necessarily, contain urea in an amount of up to about 10 parts, usually less than 5 parts and advantageously within a range from 0.5 to 2 parts, by weight. Urea was found to reinforce the activating action of the composition and also to have the effect of stimulating the tree itself.

To prepare a liquid composition according to this invention, either powdered lignosulfite, and optionally urea, may be dissolved in dilute sulfuric acid (having a concentration of 30–60 percent, for example), or an aqueous lignosulfite solution may be used and mixed with concentrated sulfuric acid (66° Be) for example.

The composition of this invention is usually applied onto the notches of the trees either by spraying, in the case of a liquid composition, or in the form of cords, in the case of a pasty composition.

The composition may be prepared at the time of application or beforehand; in this case, however, in view of its hygroscopic character, it will advantageously be stored under air— and moisture-free conditions.

The composition is useful for activating the tapping of numerous live trees, more particularly of the Pinus family, typically of *Pinus palustris* (South-East of the U.S.A.), *Pinus taeda* (South-East of the U.S.A.), *Pinus radiata* or *insignis* (California), *Pinus elliotii* (South-East of the U.S.A.), *Pinus silvestris* (Europe and Asia), *Pinus Halepentis* (Mediterranean area), *Pinus nigra* (Austria, U.S.S.R.), *Pinus nigricans* (Austria), *Pinus pinaster* (Mediterranean and Atlantic areas), *Pinus cynesis* (China), *Pinus brutia* (Turkey, Albania), and the like.

It was found that its use resulted in an increased resin yield of the order of 5–10 percent over that resulting from the conventional tapping with 48° Be sulfuric acid, according to the nature of the trees, of the climate, of the soil and of the composition.

The following non limiting examples are given to illustrate the invention.

EXAMPLE 1

The following composition was prepared for use in a 500 ml capacity spraying device: 75 g of powdered ammonium lignosulfite (pH 3 grade) dissolved in 750 g of 60 percent sulfuric acid (48.3° Be).

This composition was sprayed onto the notches formed in *Pinus pinaster* trees planted in a variety of soils, and the amount of resin collected over one season was compared with that obtained from trees of the same family planted in the same soils and tapped by means of 48° Be sulfuric acid, according to the conventional method. The results obtained are set forth in the table below.

| 25 Tree lots Lot No. | Conventional tapping kg | Tapping with the composition of the invention kg | Yield increase kg | % |
|---|---|---|---|---|
| 1 | 64.600 | 70.275 | 5.675 | 8.78 |
| 2 | 83.500 | 90.750 | 7.250 | 8.68 |
| 3 | 65.625 | 70.350 | 4.725 | 7.2 |
| 4 | 48.875 | 51.575 | 2.700 | 5.5 |

The results from one lot to another lot differ naturally due to the nature of the soils, of the height of the notches and their orientation.

Thus, in a same lot, the trees having been worked in the same manner according to a time-schedule issued at the beginning of the testing period, the differences obtained are only due to the action of the product.

EXAMPLE 2

A 500 ml dose of liquid activating composition is prepared, using a 27.77 wt. percent aqueous ammonium lignosulfite solution (75 g of powdered lignosulfite dissolved in 270 g of water) and by adding thereto 405 g of 66° Be sulfuric acid.

EXAMPLE 3

An activating composition is prepared by dissolving 136 g powdered ammonium lignosulfite in 614 g of 30 percent sulfuric acid (27° Be).

EXAMPLE 4

An activating composition is formed from the following components:
10 wt. percent ammonium lignosulfite
1 wt. percent urea
89 wt. percent 48° Be sulfuric acid (about 50 wt. percent).

The powdered lignosulfite and the urea are dissolved in the sulfuric acid, to give a sprayable liquid composition.

Having now described my invention, what I claim as new and desire to secure by Letters Patent is:

1. Process for activating the tapping of trees, particularly of live trees of the Pinus family, consisting of applying on notches formed in the trees an activating composition comprising, by weight, 5–60 parts, based on dry material, of a lignosulfite selected from the group consisting of the alkali metal, alkaline-earth metal and ammonium lignosulfites and 24-93 parts, calculated as $H_2SO_4$, of an aqueous sulfuric acid having a $H_2SO_4$ concentration of from about 30 to about 94 wt. percent.

2. Process as claimed in claim 1, wherein said activating composition further contains from 0.5 to 10 parts by weight of urea.

3. Process as claimed in claim 2, wherein the amount of said urea is of from 0.5 to 5 parts, by weight.

4. Process as claimed in claim 1, wherein the lignosulfite is ammonium lignosulfite used in powder form.

5. Process as claimed in claim 1, wherein the lignosulfite is ammonium lignosulfite used in the form of an aqueous solution.

6. Process as claimed in claim 1, wherein the lignosulfite is sodium lignosulfite.

7. Process as claimed in claim 1, wherein the lignosulfite is calcium lignosulfite.

8. Process as claimed in claim 1, wherein said lignosulfite is present in said activating composition in an amount of 5–15 parts by weight.

9. Process as claimed in claim 1, wherein said composition is applied in liquid form.

10. Process as claimed in claim 1, wherein said composition is applied in paste form.

11. Process as claimed in claim 10, wherein said composition further contains an inert inorganic filler.

* * * * *